April 19, 1932. C. W. FLOSS 1,854,251
INDEXING DEVICE
Filed Nov. 12, 1928 2 Sheets-Sheet 1
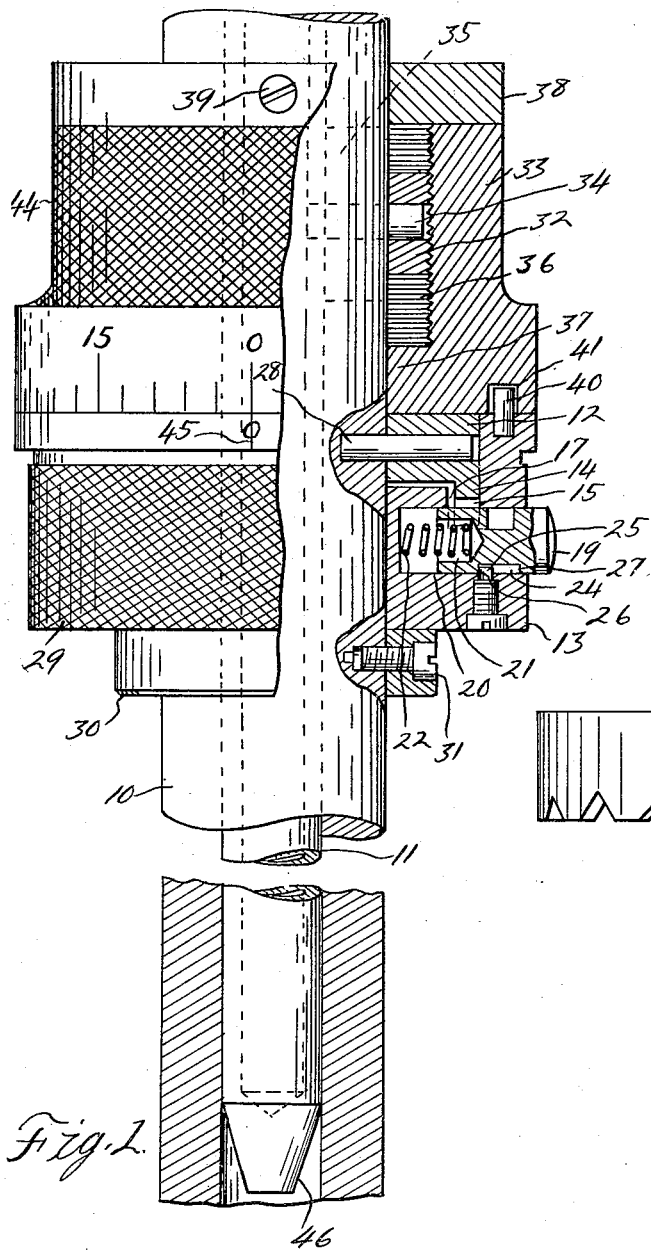
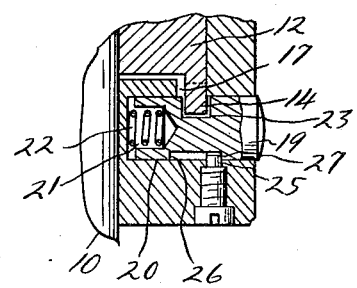
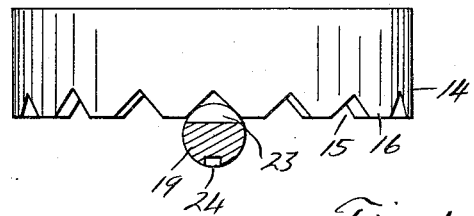
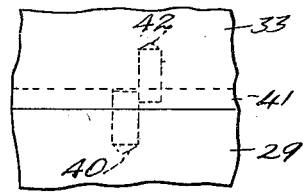
INVENTOR
Carl W. Floss
BY Whittemore Hulbert
Whittemore & Belknap
ATTORNEYS April 19, 1932.  C. W. FLOSS  1,854,251
INDEXING DEVICE
Filed Nov. 12, 1928  2 Sheets-Sheet 2
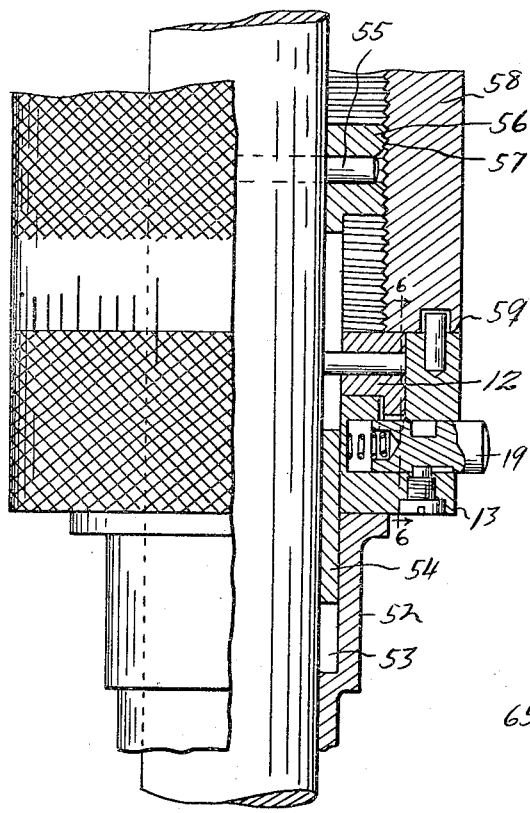
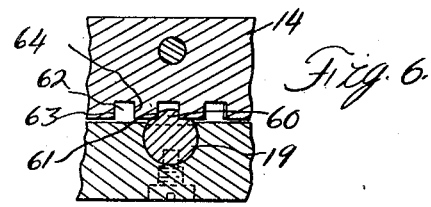
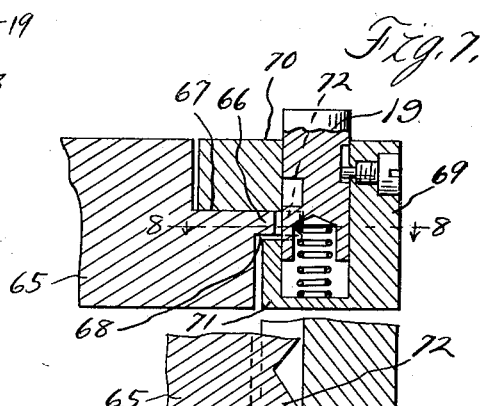
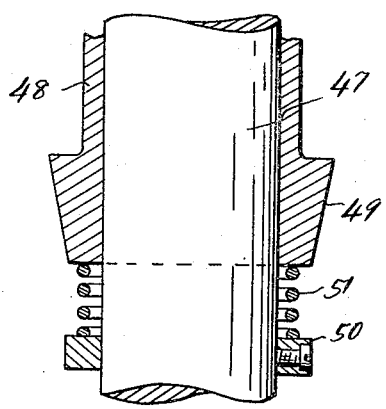
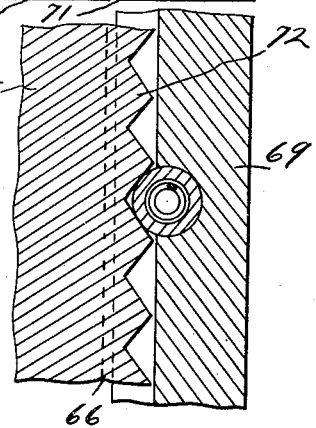
INVENTOR
Carl W. Floss
BY Whittemore Hulbert
Whittemore & Belknap
ATTORNEYS Patented Apr. 19, 1932

1,854,251

UNITED STATES PATENT OFFICE

CARL W. FLOSS, OF DETROIT, MICHIGAN

INDEXING DEVICE

Application filed November 12, 1928. Serial No. 318,880.

The invention relates to indexing mechanisms for tools and other apparatus, the functions of which must be positively and progressively adjusted. It is particularly applicable to cylinder honing or lapping tools, but may also be applied to cutting tools of all kinds that require a quick and positive change of adjustment. In the broader aspects, the invention also contemplates an indexing device adapted to adjust elements moving in a straight line parallel to each other. This latter arrangement finds particular utility for honing or finishing multiple cylinders in a block on a single spindle machine where the position of each cylinder under the spindle must be accurately and quickly located.

The principal object of the invention is to provide an indexing device applicable to various tools and quickly and easily adjustable by manual operation.

Another object is to provide a device wherein the locking plunger is automatically moved to locking position as soon as released and is held in locking position during the rotation of the tool by centrifugal force, thus insuring that the device will remain in the desired position of adjustment.

The above and other objects are attained by my invention, several embodiments of which are hereinafter described in detail and illustrated in the accompanying drawings, wherein Figure 1 is a longitudinal section through the improved indexing device applied to a tool wherein an accurate longitudinal adjustment of two members is desired;

Figure 2 is a sectional view illustrating the position of the plunger during the adjustment of the device;

Figure 3 is an elevation of the notched indexed member in engagement with the plunger, the latter being shown in section;

Figure 4 is an elevation of the device;

Figure 5 is a longitudinal section through a modified construction;

Figure 6 is a section on the line 6—6 of Figure 5;

Figure 7 is a cross section of a modified form of indexing device adapted for controlling two parts having rectilinear movement;

Figure 8 is a transverse section on the line 8—8 of Figure 7.

Referring now to the construction illustrated in Figures 1 to 4 inclusive, 10 represents a hollow outer shaft and 11 an inner shaft, both forming part of a tool such, for example, as a cylinder honing or lapping tool. The shafts 10 and 11 are axially slidable with respect to each other in order to adjust the tool (not shown) and my improved form of indexing device is adapted to control the longitudinal adjustment thereof. As an example of a tool to which my invention is applicable reference may be had to my co-pending application Serial No. 231,739 filed November 7, 1927.

The indexing device comprises two relatively movable members, which in the modification illustrated in Figure 1, are respectively the collars 12 and 13 both surrounding the outer shaft 10. The collar 12 is provided with a lower annular flange 14 having notches or serrations 15 formed therein. The teeth 16 between the adjacent notches therefore extend axially of the collar 12 and the flange 14 on which the teeth and notches are formed extends into an annular groove 17 formed in the collar 13. Extending radially of the collar 13 is a plunger 19 which is slidable within the bore 20 and normally has the outer end thereof extending beyond the periphery of the collar 13. The plunger 19 has a recess 21 for receiving one end of a coil spring 22, the other end of which rests on the bottom of the bore. The body of the plunger is of a size to accurately fit the notches 15 of the index member. The plunger has a cross slot 23 on one side thereof and the notch 24 on the opposite side thereof. The slot 23 is adapted to register with the teeth 16 when the plunger 19 is pressed inwardly, thus disconnecting the plunger and the collar 12. The notch 24 is provided to receive the end of a pin 25 secured to the collar 13. The pin 25 prevents rotation of the plunger 19 in its bore and permits longitudinal movement of the plunger between certain limits, the shoulder 26 at one end being arranged to limit the outward movement of the plunger when the latter engages the notches 15 and the shoulder 27 at the other end of the notch 24, serving to limit the inward movement of the plunger to secure registration.

The collar 12 is non-rotatably secured to the outer shaft 10 by means of a pin 28, while the collar 13 is rotatable on said shaft whenever the plunger 19 is pressed inwardly to release the teeth 16. The collar 13 preferably has a knurled outer surface 29 for facilitating the adjustment of the same, and the collar is held from axial movement on said shaft by a thrust collar 30 secured to the shaft 10 by a screw 31.

The adjustment means for controlling the relative axial movement of the shafts 10 and 11 comprises a nut 32 and cooperating threaded sleeve 33. The nut 32 is slidably mounted on the outer shaft 10 and secured to the inner shaft 11 by a pin 34 which extends through an axial slot 35 in the outer shaft 10. The slot 35 is of sufficient length to permit the longitudinal adjustment of the two shafts and is of a width to accurately fit the pin 34 and prevent rotative movement of these two parts. The sleeve 33 has its interiorly threaded inner surface 36 spaced from the shaft 11 and engaging the exterior threads on the nut 32. The sleeve also has the radially inward projecting flange 37 mounted on the shaft 10 for rotation relative thereto. 38 is a thrust collar secured by a screw 39 to the shaft 10 and serving to prevent axial movement of the sleeve 33. For drivingly connecting the sleeve 33 and the collar 13 a unidirectional connection is desired in order to permit the indexing device to be set to the desired position without actually moving the shafts relative to each other. This connection consists of a pin 40 projecting from the upper surface of the collar 13 into an annular groove 41 in the lower face of the sleeve 33. A second pin 42 projects downwardly into the groove 41 and is anchored in the sleeve 33. The outer surface of sleeve 33 is preferably knurled as indicated at 44 and the sleeve has graduations around the circumference of the same which cooperate with a line 45 on the circumference of the collar 13.

With a construction as above described, the rotative drive for the tool is transmitted through the outer shaft 10, while the inner shaft 11 is used for adjustment purposes. While my invention is not limited to any particular type of tool, the form of device illustrated in Figure 1 is intended to be used for radially adjusting the stones of a honing or lapping tool such as is illustrated in the co-pending application above referred to. Thus, the lower portion of the inner shaft 11 is provided with a conical surface 46, by means of which the honing stones (not shown) are radially adjusted in accordance with the axial movement of shaft 11.

In using the indexing device as above described, the operator grasps the knurled collar 13 and depresses the plunger 19 with the thumb or fingers until the slot 23 registers with the teeth 16, thus releasing the collar 13 from the collar 12 and shaft 10. The collar 13 is then rotated sufficiently to provide the desired adjustment, this being indicated by the advance of the line 45 over the calibrations on the sleeve 33. The calibrations preferably corresponding to a predetermined radial adjustment of the honing stones or other device to which the indexing mechanism is applied. The plunger is then released and automatically returns to a position wherein it engages the serrations 15 and locks the collars 12 and 13 from rotative movement. The rotation of collar 13 advances the pin 40 with respect to pin 42 and thus permits the manual adjustment of the sleeve 33 which, due to its threaded engagement with nut 32, causes axial adjustment of the shaft 11 relative to the outer shaft 10.

Figures 5 and 6 illustrate my invention applied to a tool of different construction. The indexing device itself is similar to that previously described consisting of the fixed collar 12 and rotating collar 13 normally interlocked by the plunger 19. In the modified construction the tool consists of an inner shaft 47 forming the driving element of the tool and an outer sleeve 48 having the inclined cam surface 49 for radial adjustment of the honing stones upon axial adjustment of the sleeve. 50 is a collar on the shaft 47 and 51 a spring between said collar and the sleeve 48 for maintaining the sleeve in engagement with the collar 13 at all times. The upper end of sleeve 48 is enlarged at 52 and has an enlarged inner bore 53. 54 is a tubular member surrounding the shaft 47 and having its lower end arranged within the enlarged bore 53 and having its upper end secured to the shaft 47 by a pin 55. The upper end of the tubular member is enlarged at 56 and provided with external threads 57 forming an adjusting nut. 58 is a sleeve threadedly engaging the nut and arranged to have its lower surface 59 bear against the upper surface of the collar 13.

In operating the device illustrated in Figure 5, the plunger 19 is depressed in the manner indicated above and the collar 13 rotated the desired distance whereupon the locking plunger is released. In this construction it will be noted that the sleeve 58 causes axial movement of the outer shaft 52 only in a downward direction, whereas the upper or return movement is non-positive due to the action of the coil spring 51.

In Figure 6 I have illustrated a slightly modified construction of locking pin, the plunger 19 being provided with a tooth 60 having square sides 61 adapted to accurately fit in the interdental spaces 62 of the annular flange 14. The sides 63 and 64 of the interdental spaces are in this case made parallel and are spaced apart to accurately fit the tooth 60.

In Figure 7 I have shown the indexing arrangement applied to a device for indicating the extent of rectilinear movement. Thus, as shown 65 is a plate having a projecting flange 66 extending therefrom forming the upper and lower flat surfaces 67 and 68. 69 is a sliding member having a projecting portion 70 resting on the surface 67 and a projecting portion 71 engaging the surface 68. The flange 66 has rack teeth 72 on the edge thereof arranged to extend into the path of the plunger 19, the latter being constructed in a similar manner to the devices heretofore described.

While I have illustrated several specific embodiments of my invention, it is to be understood that the invention in its broader aspects is capable of still further modification and the scope of the invention is to be construed only in the light of the claims appended hereto.

What I claim as my invention is:

1. An indexing device including a pair of relatively movable members, a plunger movable in one of said members in a direction transverse to the direction of relative movement of said members, the other of said members being provided with a series of teeth projecting into the path of movement of said plunger, said plunger being formed with a portion engageable with said teeth, said plunger also having a recess larger than said teeth, a spring urging said plunger into engagement with said teeth, said plunger having a portion projecting beyond the member in which it is mounted to permit manual depression of the same for registering said recess with said teeth.

2. An indexing device including a member having a series of teeth formed thereon, a second member slidable with respect to said first member and having a bore therein extending transverse to the direction of sliding movement, a plunger movable in said bore, a spring within said bore normally urging said plunger outward, said plunger having a recess adapted to register with said teeth when said plunger is moved inwardly, said plunger having a peripheral surface engageable with said teeth and means for limiting the axial movement of said plunger between a position to engage said teeth and to register said slot with said teeth.

3. An indexing device including a pair of annular collars mounted for relative rotation, a plunger movable in one of said collars in a direction transverse to the direction of rotative movement, an annular series of teeth on the other collar arranged in the path of movement of said plunger, a spring acting outwardly on said plunger, said plunger having a slot extending transversely thereof and adapted to register with said teeth when said plunger is moved inwardly.

4. An indexing device including a pair of annular members relatively movable with respect to each other, one of said members having a radial bore therein, the other member having a circumferential series of teeth arranged in a plane intersecting said radial bore, a plunger in said bore engageable with said teeth and having a transverse slot therein registrable with said teeth when said plunger is moved radially inward, a spring for urging said plunger radially outward and a stop for limiting the radial adjustment of said plunger.

5. An indexing device including a ring, a flange on said ring extending longitudinally thereof, a series of teeth on the edge of said flange, a second ring mounted for rotation with respect to said first ring and having a radial bore therein, a plunger in said bore, a spring within said bore engaging said plunger, said plunger having a slot extending longitudinally thereof on the other side and a second slot extending transversely on the diametrically opposite side of said plunger, a pin engaging said first mentioned slot, said plunger having a portion arranged radially inward of said second recess formed to engage said teeth.

6. An indexing device including a pair of longitudinally adjustable members, a nut fixed to one of said members, a threaded sleeve engaging said nut, a ring interposed between said sleeve and the other of said longitudinally adjustable members adapted to transmit axial movement therebetween, said ring being rotatable with respect to said members, a second ring member non-rotatably secured to one of said adjustable members and having a series of teeth, a plunger radially movable in the first mentioned ring member having a portion for engaging said teeth when said plunger is in its radially outward position and means for releasing said plunger from said teeth when moved radially inward.

7. An indexing device including a pair of longitudinally adjustable members, a nut fixed to one of said members, a sleeve threadedly engaging said nut, a toothed element non-rotatably secured to one of said members, a cooperating tooth member movable into and out of engagement therewith and a unidirectional driving connection between said sleeve and the last mentioned tooth member.

8. An indexing device comprising a pair of longitudinally movable members, a nut non-rotatably secured to one member, a sleeve threadedly engaging said nut, a ring bearing against said sleeve in an axial direction, said ring bearing against the other of said adjustable members thereby transmitting thrust between said sleeve and said member, a latch movable in said ring and a toothed element non-rotatably secured to one of said adjustable members and engageable with said latch.

9. An indexing device for adjusting a member longitudinally including, a pair of annular members surrounding the member aforesaid and capable of relative rotation, a plunger movable in one of said annular members in a direction transverse to the direction of rotative movement, a series of teeth on the other of said annular members arranged in the path of movement of said plunger, said plunger operable in one position thereof to engage the teeth aforesaid and prevent movement of said annular members relative to each other and operable in another position to permit relative movement of said members, and means establishing a driving connection between said longitudinal adjustable member and one of said annular members operable upon a predetermined relative movement of said annular members to move said adjustable member longitudinally a predetermined distance.

10. An indexing device for axially moving a plunger including, a pair of annular collars surrounding said plunger and capable of rotation relative to each other, a latch movable in one of said collars, a series of teeth projecting from the other of said collars, said latch operable in one position thereof to engage the teeth aforesaid and prevent movement of said collars relative to each other and operable in another position to permit relative movement of said collars, and means forming a unidirectional driving connection between the plunger and one of said collars operable upon a predetermined relative rotation of the collars to move said plunger axially a predetermined distance.

11. An indexing device for axially adjusting a plunger including, a shaft surrounding the plunger having an axially extending recess therein, a pair of collars surrounding the shaft and mounted for rotation relative to each other, a latch movable in one of said collars operable in one position to engage the other of said collars and prevent relative rotation thereof and in another position to permit relative rotation of said collars, a pin carried by said axially movable plunger and projecting through the recess aforesaid formed in the shaft, a nut surrounding said shaft and having a recess therein for receiving the projecting end of said pin, a sleeve threadedly engaging said nut, means preventing axial movement of said sleeve, and means forming a unidirectional driving connection between said sleeve and one of said collars operable upon a predetermined relative rotation of the collar to move said plunger axially a predetermined distance.

12. An indexing device including a pair of relatively movable members, a plunger movable in one of said members in a direction transverse to the direction of relative movement of said members and having a portion normally engaging teeth formed on the other of said members for preventing relative movement thereof, said plunger having a recess adjacent the portion aforesaid of greater width than the width of said teeth whereby movement of the plunger in one direction from the aforesaid position registers the recess in the plunger with the teeth and thereby permits relative movement of the members.

In testimony whereof I affix my signature.

CARL W. FLOSS.